April 2, 1963  W. C. STOVALL, JR  3,083,794
JOINED SHEET METAL STRUCTURES
Filed April 12, 1960  3 Sheets-Sheet 3
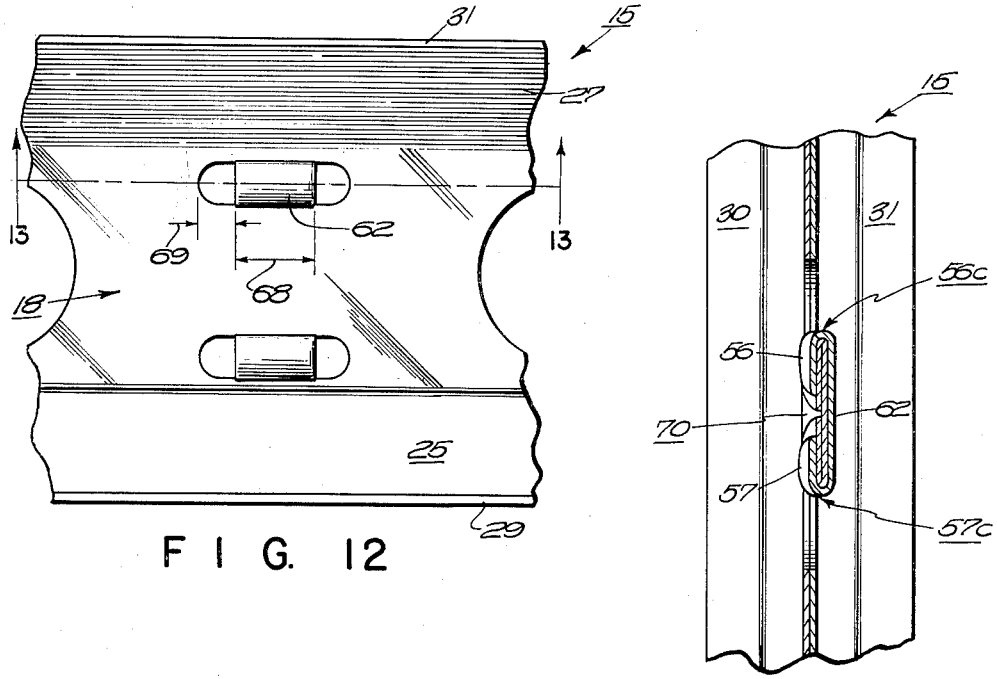
FIG. 12
FIG. 13
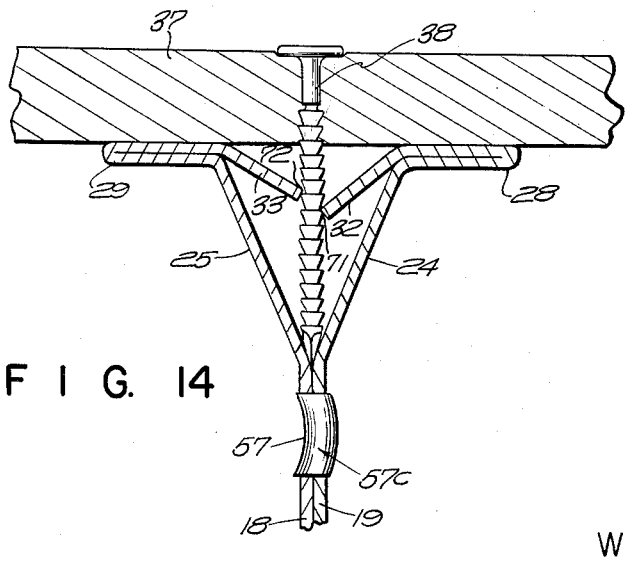
FIG. 14
*INVENTOR.*
WILBUR C. STOVALL, Jr.
BY
*Dike, Thompson & Bronstein*
ATTORNEYS › # United States Patent Office 3,083,794
Patented Apr. 2, 1963

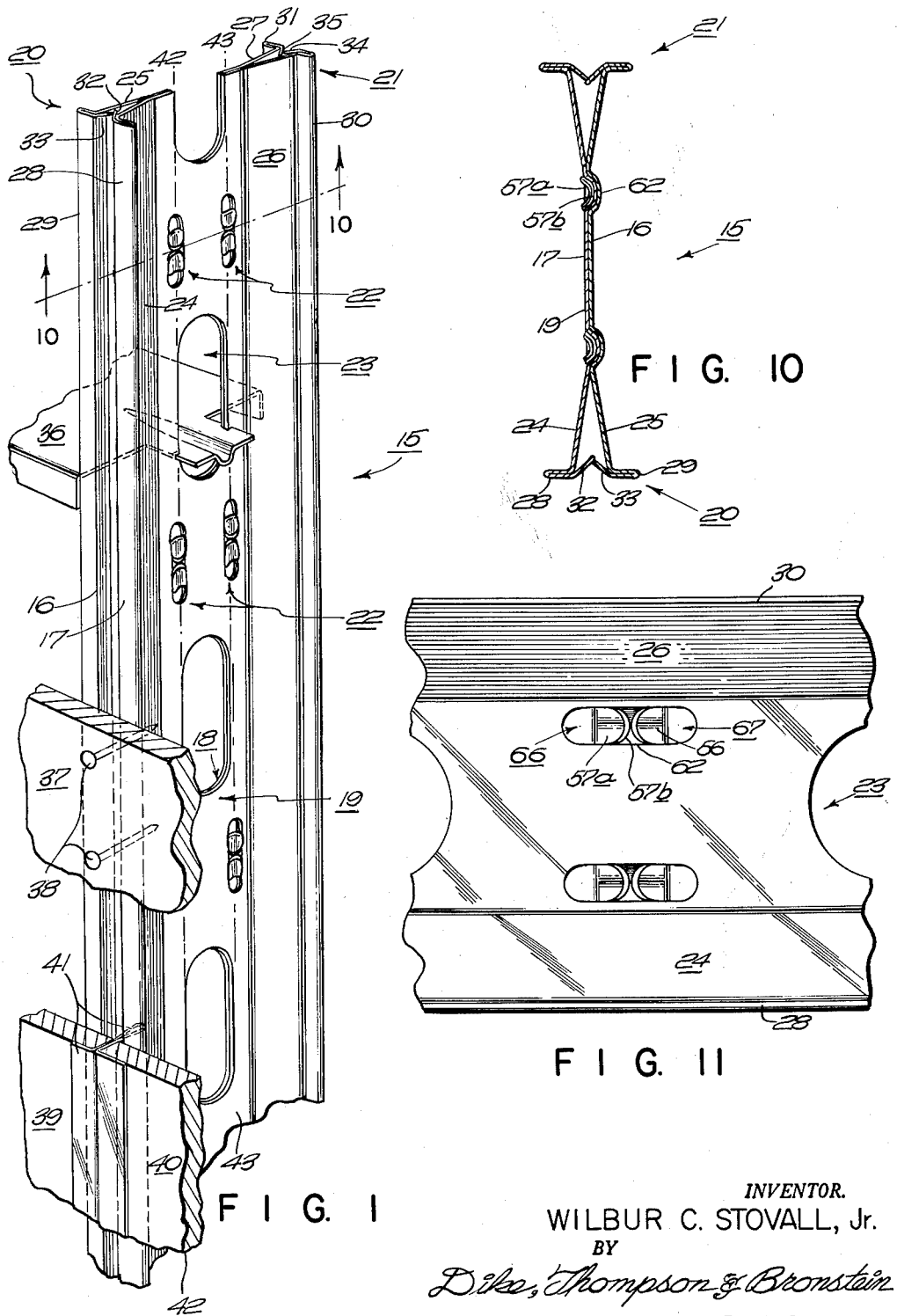

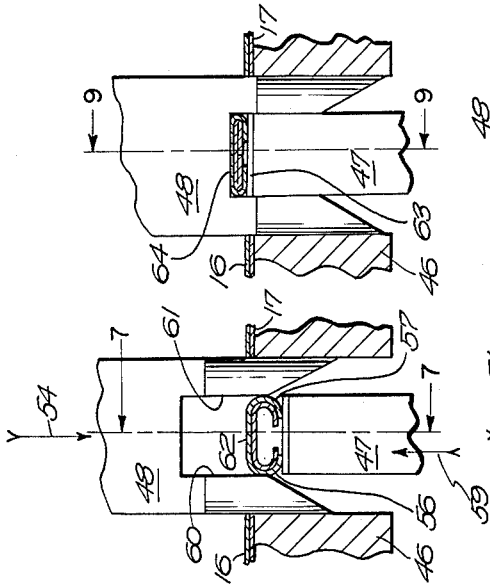
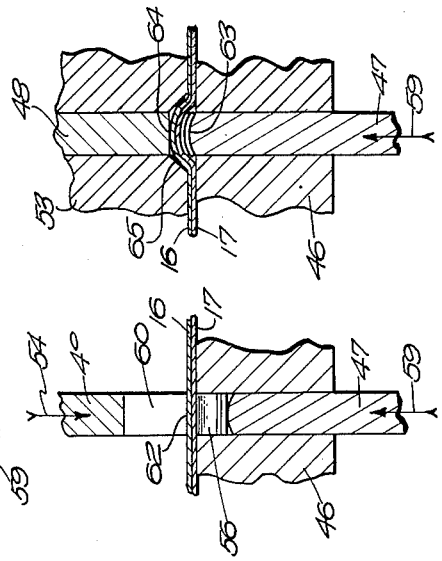
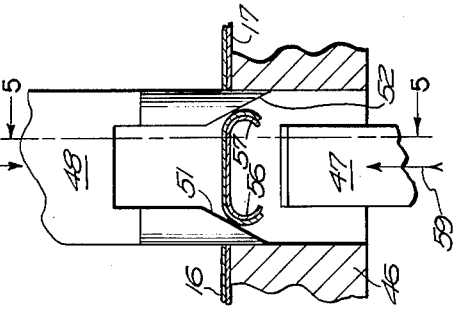
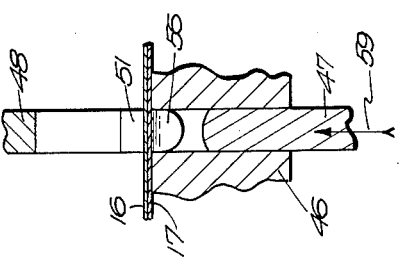
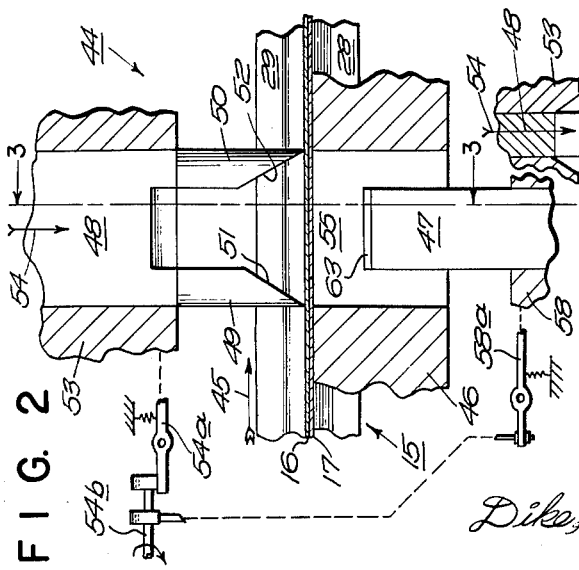

3,083,794
JOINED SHEET METAL STRUCTURES
Wilbur C. Stovall, Jr., Vienna, W. Va., assignor to Penn Metal Company, Inc., Boston, Mass., a corporation of Delaware
Filed Apr. 12, 1960, Ser. No. 21,666
9 Claims. (Cl. 189—34)

The present invention relates to improvements in the fabrication of composite metal structural units and, in one particular aspect, to novel and improved sheet metal structure, such as nailable studding, in which overlapping parts are uniquely and permanently locked together at low cost of manufacture.

In the production of prefabricated sheet metal studs and other building elements used in the construction industry, to which the teachings of this invention are particularly pertinent, it is frequently necessary to unite securely certain overlapping flat sections of the sheet metal. While there are of course numerous well-known fastening techniques which can be practiced, these have not proved satisfactory for such sites as the web sections of composite metal scantling or studs, where the abutting layers of metal may be subjected to large forces tending to pry them apart and which must also lend themselves to inexepnsive and uncomplicated prefabrication at high assembly-line speeds if such members are to be of commercial advantage. One form of lightweight steel stud of generally I-beam cross-section, for example, comprises a pair of preformed sheet-metal elements which must be secured together in back-to-back relationship during initial assembly, along the portions which are to make up the central web of the stud. Of the know techniques which may be resorted to, bolting and rivetting prove to be complicated and laborious practices which further require preparatory drilling, welding involves costly equipment and skilled personnel, and machine stapling fails to provide as secure a locking as is wanted when the halves of the composite member tend to become spread apart by nails, clips or other fasteners driven into the accommodating cross-legs of the I-shaped stud to hold laths, panelling, and the like. According to the present teachings, however, the demands for simple permanently-tight fastening which can be developed rapidly and economically are satisfied in a unique clinching wherein the sheet metal itself forms special cooperating tabs shaped to preclude unlocking in use.

It is therefore one of the objects of this invention to provide an improved method for permanently fastening overlapping sheet metal elements together at low cost and at high production rates.

Another object is to provide an improved method for securing together the parts of composite sheet metal constructional members wherein material of the parts themselves is punched and pressed in a single operation to form clinching of unique configuration which prohibits accidental unlocking.

An additional object is to provide improved sheet metal fastenings of inexpensive manufacture requiring no fastening material other than that of the sheets themselves and shaped to have unusually high strength even when formed of relatively thin sheet material.

It is a yet further object to provide improved prefabricated composite sheet metal studding in which the overlapping sheets forming central webbing and subject to separation in use are readily fastened together permanently by integrally-formed clinches each involving twin tabs folded and stamped to have a set concave curvature which develops increased rigidity of the stud and prevents loosening of the fastenings.

By way of a summary account of practice of this invention in one of its aspects, I prepare a pair of elongated thin sheet metal members each similarly shaped to serve as half of a composite stud of cross-sectional outline like that of an I-beam, and place these in back-to-back relationship with the portions intended to serve as the central web in contiguous relationship to one another. The paired members are then fed longitudinally through a press having cooperating male and female die elements which are controlled for reciprocation synchronously toward and away from a mating engagement, the female die also being provided with a pair of spaced punches shaped to pierce the overlapping sheets and thereby cut two spaced tabs in them. The press elements are oriented to align the spaced tabs with the longitudinal direction of the stud, although outwardly nearer its cross legs. The female die and punch element is further provided with inclined surfaces which bear against the tabs and force them to curl toward one another before the male die engages them and completes the folding of the two tabs against one side of the webbing. Upon full mating of the two dies, their complementary substantially cylindrical end surfaces impress a distinct concave shape both upon the folded tabs themselves and upon the overlapping sheet material below and between them. The resulting clinch is of somewhat cylindrical configuration, protruding outwardly but entirely smoothly along one side of the web and forming a slight depression on the opposite side into which the tabs are almost fully recessed and from which they cannot be accidentally caught and lifted to loosen the fastening. Moreover, the concavity of the tabs at their folded ends inherently prohibits the tabs from lifting and they therefore cannot be worked loose in the manner which is notorious in the case of simple tabs. The elongated cylindrical indentation simultaneously received by the web material when the tabs are locked also imparts a further locking of the sheets against relative slippage and the maximum strength of the cylindrical indentation is desirably in the longitudinal direction of the stud where it is most needed to preserve optimum load-carrying capacity.

Although the features of this invention which are believed to be novel are set forth in the appended claims, details as to its practice in preferred forms, as well as the further objects and advantages thereof, may be most readily comprehended through reference to the following description taken in connection with the accompanying drawings, wherein:

FIGURE 1 is a pictorial view, with portions broken away, of a prefabricated composite stud of thin sheet metal the webbing of which is securely locked by improved permanent fasteners, together with associated brace, panel and attachment devices in a partitioning installation;

FIGURE 2 is partly cross-sectioned view of a punch and die assembly for forming the improved fastening of the composite stud of FIGURE 1, the movable elements being poised for commencement of a first-stage cutting operation;

FIGURE 3 is a partly cross-sectioned view of the punch and die assembly taken in a transverse direction along section lines 3—3 in FIGURE 2;

FIGURE 4 is a view corresponding to that of FIGURE 2 taken during a second stage of the forming operation;

FIGURE 5 is a view corresponding to that of FIGURE 3 taken along section line 5—5 of FIGURE 4 during the second stage of the forming operation;

FIGURE 6 is a view corresponding to that of FIGURE 2 taken during a third stage of the forming operation;

FIGURE 7 is a view corresponding to that of FIGURE 3 taken along section line 7—7 of FIGURE 6 during the third stage of the forming operation;

FIGURE 8 is a view corresponding to that of FIGURE 2 taken during a fourth stage of the forming operation;

FIGURE 9 is a view corresponding to that of FIGURE 3 taken along section line 9—9 of FIGURE 8 during the fourth stage of the forming operation;

FIGURE 10 is a transverse cross-sectional view of the improved stud fastening along section line 10—10 in FIGURE 1;

FIGURE 11 portrays in a side view a fragment of a nailable stud showing improved clinching from the concave side thereof;

FIGURE 12 portrays in a side view a fragment of a nailable stud showing improved clinching from the convex side thereof;

FIGURE 13 presents a longitudinal cross-section of the sheet metal stud and fastening of FIGURE 12 taken along section line 13—13 therein; and FIGURE 14 is an enlarged transverse cross-section of part of an improved nailable stud and fastening in association with a nailed section of panelling.

Having reference to the illustrations, there is depicted in FIGURE 1 a prefabricated composite partitioning stud 15 which includes two similar halves, 16 and 17, of relatively thin preformed sheet metal strips, preferably steel having certain spring-like characteristics. The two halves are in a contiguous back-to-back relationship along their central web sections 18 and 19, respectively, intermediate the cross-legs 20 and 21 of the substantially I-shaped beam, and are joined together at a plurality of sites 22 in two spaced parallel rows on either side of the punched central web openings 23. Nail-holding cross-legs of the studs are developed by portions of the sheet metal which flare outwardly, as at 24—27, from the central web, and which are bent upon themselves to form flat metal flanges, 28—31, and which are further bent inwardly to form resilient jaws 32—35 of V-shaped fastener entranceways or grooves.

Openings 23 in the normally vertical studding accommodate the lateral passage of pipe and conduit and also cooperate with interfitting bridging members, such as that shown at 36, which serve to space the studs and add rigidity to the assembled partition. Wallboard, wood panelling, lathing, and the like may be attached to the studding by means of fasteners, such as nails, screws or clips, in the manner illustrated by the attachment of panel 37 by way of nails 38 non-retractably bound in jaws 32 and 33, and by abutting panel sections 39 and 40 secured by the shaped sheet metal clip 41.

The two spaced parallel and longitudinal rows, 42—42 and 43—43, along which the beam halves are joined, lie within the web portion of the stud but are close to the outwardly-flaring portions 24—27 where the overlapping sheets must be positively and permanently fastened together to resist the action of fasteners, such as 38 and 41, which tend to wedge them apart. Even a slight spreading between the overlapping sheets at these positions weakens the grasp of the studs on fasteners 38 and 41, and it is for this reason that heavy-gauge metal staples and like fasteners which can become loosened in use may not be entirely adequate. The importance of this is best appreciated when it is understood that one of the principal applications for prefabricated sheet metal studding is in temporary partitioning which can be dismantled and reassembled in various ways according to dictates of changed needs, and such uses subject the studs to forces which tend to dislodge or loosen its joints and thereby weaken its ability to retain auxiliary fasteners. An improved fabrication of the stud sheet metal itself into joints which avoids these difficulties appears at each of the spaced sites 22, where the overlapping sheets are cut and the two integral tabs which result are folded toward one another and are bent into a cylindrical configuration together with the intervening material of the two sheets.

The nature of these joints, as well as the process and tooling by which they are formed, appears from the sequence of operations portrayed in FIGURES 2, 4, 6 and 8 together with the related transverse cross-sections in FIGURES 3, 5, 7 and 9. Referring first to FIGURE 2, the two back-to-back roll-formed halves 16 and 17 of the as yet incomplete stud 15 are shown in a longitudinal cross-section taken along a path such as that of row 42—42 in FIGURE 1 as they are halted momentarily during an intermediate feed through a punch and die assembly 44 in the direction of feed 45. The paired halves of the stud rest upon a die block or platen 46, with one of the sites 22 disposed between movable male and female die members 47 and 48, respectively, the latter having a U-shaped form in which the two integral legs 49 and 50 are of cylindrical outline and have lower cutting edges about their respective lower truncated surfaces 51 and 52. Female punch and die member 48 is mounted in a movable block 53 carried in and forming part of a vertically reciprocated die head of a known type, and at the instant of the FIGURE 2 portrayal this block has been actuated in the downward direction of movement 54 by a suitable mechanism such as the schematically illustrated follower 54a and camshaft 54b, such that the cutting legs 49 and 50 are poised upon the overlapping sheets 16 and 17 and are ready to be thrust downwardly through them into the accommodating and guiding recess 55 of the stationary die block 46.

At the next successive stage in this sequence of operations, represented in FIGURES 4 and 5, the cutting die 48 has descended part way into the die block recess 55 and has cut two spaced double-thickness D-shaped tabs 56 and 57 from the two overlapping sheets 16 and 17. These double-thickness tabs are forced to curl inwardly toward one another on the under side of the web as they are being cut, due to the pressure of the truncated punch surfaces 51 and 52 which bear against the tabs in the manner illustrated as the punch continues its travel into the die block. The simultaneous cutting actions of the two legs advantageously involves only balanced opposed forces on the stud and therefore do not cause the layers 16 and 17 to slip.

Throughout the two stages considered thus far, and with reference to FIGURES 2–5, the lower male die member 47 has remained out of contact with the upper die member 48 and with the sheet metal, and preferably is held stationary by its supporting block 58. However, the third stage in the sequence, depicted in FIGURES 6 and 7, involves both a further downward movement of upper die member 48 and a simultaneous upward movement of the lower die member 47 in the direction of movement 59. The latter motion may of course be produced by known mechanisms, as by a suitable follower arm 58a or the like actuating block 58 in response to movement of the camshaft 54b or other drive member which moves the upper die member 48. As is shown in FIGURE 6, the female punch and die member 48 is provided with a central opening the side walls 60 and 61 of which are aligned with corresponding sides of the lower die member 47 and permit the two members to fit together after the tabs have been cut and curled in the manner described. During this mating of the dies, the double-thickness tabs 56 and 57 and the intermediate double-thickness section 62 of the web are confined between the side walls 60 and 61 of the upper die while the top of the lower die presses against the inwardly-curled tabs from below and forces them upwardly toward the under side of the intermediate section 62.

At the completion of their movement toward one another, the mated die members deliver a concave and generally cylindrical shape to the intermediate section 62 and to the tabs which are then flattened against it. The nature of this action is evident from the views of FIGURES 8 and 9, the cylindrically-shaped top surface 63 of the lower die there being shown as compacting the tabs and imparting an important corresponding cylindrically-shaped configuration both to the tabs and to the intermediate section 62 against which they are folded in metal-to-metal contact. It is not necessary that the upper surface 64 of the die recess in upper die member 48 engage the top of the sheet metal section 62, because the upper die block 53 serves as a stripper which engages the sheet metal web and holds it firmly against the die block 46 while the lower die bulges the tabs and intermediate section of material in the desired manner. The stripper is relieved around the intended area of the cylindrical shaping, preferably by means of a simple chamfering 65 which need not be cylindrical and can therefore be machined easily. The use of a non-critically chamfered stripper avoids the need for any special concave shaping of the upper die surface 64, and manufacture and maintenance of the upper die member 48 itself are vastly simplified. The concave shape of the clinched joints which are fashioned in this way is not limited to the illustrated cylindrical configuration but may have other concave forms as well, although the cylindrical outline is preferred because of the smoothness of its exterior and absence of sharp edges. By forming the joints such that they curve upwardly, rather than downwardly into the die block recesses, the stud remains free of the die block once the die members are retracted and the longitudinal feeding of the stud in the direction of arrow 45 is unimpeded. The final stage in the complete joining cycle comprises a retraction of the die members wholly out of engagement with the stud, whereupon the stud may be advanced and the complete cycle of cutting, curling, pressing, and forming a concave configuration may be repeated with each full stroke of the punch and die assembly 44. Pairs of joints, or more than this number, may be produced with each stroke, depending upon the number of units, like that in FIGURES 2–9, with which the machinery is equipped.

The transverse cross-section of prefabricated stud 15 which appears in FIGURE 10 illustrates the smooth outlines of the resulting joints and also indicates that the ends of the folded tabs, such as the overlapping tabs 57a and 57b, are pressed within the concave joints where they will not be accidentally caught and lifted to a loosened unclenched position. The side view of part of this same stud shown in FIGURE 11 portrays the joints from the concave sides theerof, the D-shaped cuts 66 and 67 for the tabs being apparent, and it is also being indicated in the FIGURE 12 view from the opposite side that the intermediate sections 62 of the joints are of a length 68 at least about twice the length 69 of each of the tab cuts 66 and 67. These relative proportions permit the innermost tab layers 57b and 56b to lie in metal-to-metal contact with the under side of the intermediate section without overlapping, a condition which would add to the bulk of the joint and would expose the tab ends to accidental lifting. Longer concave joints are also useful, of course. The concave multiple joints not only aid in locking the two halves 16 and 17 against separation from their contiguous back-to-back releationship but also strongly resist slippage and turning between these component parts. Alignment of the elongated joints in the longitudinal direction of the stud advantageously causes the stiff cylindrical joints to add their principal strength in the load-carrying direction of the stud and spreads the desired locking effects along those areas where auxiliary fasteners such as fasteners 38 and 41 most tend to separate the halves of the stud.

In FIGURE 13, the longitudinal cross section is taken through one of the clenched joints to reveal the overlapped relationship of the two tabs and the intermediate section with which they are pressed into a substantially cylindrical form. The concave cylindrical shaping which extends throughout the lengths of the tabs, and along the bases 56c and 57c about which the tabs has been bent and folded, imparts a stiffness which very effectively prohibits the tabs from being lifted out of the channels. This is to be distinguished from the case of a flat tab, which can readily be bent upwardly. As has already been mentioned, accidental lifting is also avoided because the tab ends are recessed within the cylindrical channel 70; however forces which tend to pry the sheets apart also tend to bend the tabs outwardly so that the sheets will be freed, and it is this undesirable result which is entirely avoided by the concave shaping at tab edges 56c and 57c. Ratchet-type nail 38 in FIGURE 14 is depicted as tending to wedge the web sheets 18 and 19 apart, for example, and the concave tab edge 57c nevertheless prevents the tab 57 from unfolding. The locking effect is therefore maintained permanently, without any weakening such as would permit the nail to pry itself loose from the binding effects of the sprung nail-holding edges 71 and 72. Moreover, the solidity and permanence of the junctions make it unnecessary for the nails to be driven deeply into the web sections to realize greater holding power, as has heretofore been dictated because of the weaknesses of other junctions.

It should be understood that the specific embodiments of this invention disclosed herein are of a descriptive rather than a limiting nature and that various changes, combinations, substitutions, or modifications, may be effected in accordance with these teachings without departing in spirit or scope from this invention in its broader aspects.

What I claim as new and desire to secure by Letters Patent of the United States is:

1. The method of prefabricating a sheet metal assembly in which layers of sheet metal are joined together which comprises overlapipng said layers of sheet metal, cutting through the overlapping layers to form a pair of spaced tabs each having the same number of layers as the layers of said sheet metal, bending both of said tabs out of the plane of the cut layers and back toward one side of said overlapping layers in opposite directions along said side, and pressing the bent tabs and the underlying layers of sheet metal together and forming a concave depression from said one side extending longitudinally substantially at a right angle to the line of bend of each tab.

2. The method of prefabricating a sheet metal assembly in which layers of sheet metal are joined together which comprises overlapping said layers of sheet metal, cutting through said overlapping layers to form a pair of spaced tabs while simultaneously curling said tabs out of the plane of the cut layers and back toward one side of said overlapping layers in opposite directions along said side as they are being formed, and pressing the curled tabs and the underlying layers of sheet metal together while simultaneously forming a concave cylindrically-shaped depression from said one side extending substantially longitudinally of each tab and across the curled edge of each tab.

3. The method of prefabricating a sheet metal assembly in which layers of sheet metal are joined together which comprises overlapping said layers of sheet metal, cutting through the overlapping layers to form a pair of like spaced bendable tabs of which the bases integral with said layers are parallel with one another and are spaced by a distance at least twice the length of each of said tabs, bending both of said tabs about their bases and out of the plane of the cut layers and back toward one side of the overlapping layers and toward one another, pressing together the bent tabs and the underlying layers of sheet metal intermediate said bases while simultaneously forming a concave depression therein from said one side and extending longitudinally substantially at a right angle to the bases of the tabs and fully across the tabs and the underlying layers of sheet metal.

4. The method of prefabricating a composite sheet metal stud in which two preformed elongated sheet metal members are placed back-to-back to form a stud of I-beam cross-section including a flat web portion intermediate outwardly-flaring flanges, which comprises cutting through the overlapping layers of said sheet metal members in said web portion and at a plurality of positions near both flanges to form at each of said positions a pair of bendable tabs which are closely spaced and extend in the longitudinal direction of said members, bending both of the tabs in each pair out of the plane of the web portion and back toward one side of the web portion in opposite directions longitudinally of said members, and pressing the bent tabs together with the underlying layers of said sheet metal to form a concave depression therein which extends substantially longitudinally thereof and fully across the tabs and the underlying layers of sheet metal at each of said positions.

5. The method of prefabricating a composite sheet metal stud in which two preformed elongated sheet metal members are placed back-to-back to form a stud of I-beam cross section including a flat web portion intermediate flanges shaped to hold auxiliary fasteners therein, which comprises cutting through the overlapping layers of said sheet metal members in said web portion a pair of like bendable tabs which are closely spaced and extend in the longitudinal direction of said members at each of a plurality of positions in two parallel rows extending longitudinally of said members near said flanges, said tabs being bendable about bases which are integral with said layers and are parallel with one another and said tabs in each pair being spaced by a distance substantially twice the length of said tabs, simultaneously curling the tabs in each pair out of the plane of the web portion and back toward one side of the web portion and toward one another as they are being formed, and pressing the curled tabs in each pair and the underlying layers of sheet metal between said bases together while simultaneously forming a concave cylindrically-shaped depression from said side extending longitudinally substantially at a right angle to said bases and fully across the tabs and the underlying layers of sheet metal at each of said positions.

6. A prefabricated sheet metal assembly comprising layers of sheet metal disposed in contiguous overlapping relationship, said layers having a spaced pair of tab-shaped cuts therethrough at corresponding positions in each layer, all of the layers of the tabs formed integrally with said sheet metal layers by each one of said cuts being bent in the same direction out of said cuts and back toward one side of the overlapping layers with the ends thereof extending in a direction along said one side opposite to the direction in which the ends of the other tab layers extend along said one side, and the bent tabs and the underlying layers of said sheet metal together being in the form of a concave depression from said one side which extends longitudinally substantially at a right angle to the bends of said tabs, whereby the ends of said tabs are recessed within said depression.

7. A prefabricated sheet metal assembly comprising layers of sheet metal disposed in contiguous overlapping relationship, said layers having a spaced pair of tab-shaped cuts therethrough at corresponding positions in each layer, all of the layers of the tabs formed integrally with said sheet metal layers by each one of said cuts being bent about their bases in the same direction out of said cuts and back toward one side of the overlapping layers with the ends thereof extending along said one side toward the corresponding ends of the layers of the other of the tabs, the length of sheet metal material extending intermediate said bases of said tabs being at least equal to the combined lengths of said tabs, whereby said bent tabs do not overlap, and the bent tabs and said intermediate material underlying said bent tabs together being in the form of a substantially cylindrical depression from said one side which extends longitudinally substantially at a right angle to the bends of said tabs fully across said tabs and intermediate material.

8. A prefabricated composite sheet metal stud comprising a pair of preformed elongated sheet metal members disposed in back-to-back relationship to form a stud of a substantially I-beam cross section including a flat web portion intermediate flanges shaped to grasp auxiliary fasteners therein, said members having a pair of coincident closely-spaced tab-shaped cuts therethrough in said web portion at each of a plurality of positions in two spaced parallel rows extending longitudinally of said members near said flanges, the two sheet metal layers of each of the tabs formed integrally with said members by each of said coincident cuts being bent in the same direction out of said coincident cuts and back toward one side of said web portion with the ends thereof extending toward the ends of the layers of another of the tabs, the bases of the tab-shaped cuts in each pair being parallel and spaced apart in the longitudinal direction along one of said rows by a distance substantially equal to the combined lengths of the tabs extending toward one another, whereby said bent tabs do not overlap, and the sheet metal of the web portion underlying each pair of bent tabs which extend toward one another being formed together with the pair of bent tabs as a substantially cylindrical rib depressed from said one side of said web portion, whereby said cylindrical ribs extend in said longitudinal direction along said stud and the ends of said tabs are recessed within the depressions of said ribs.

9. A prefabricated composite sheet metal stud as set forth in claim 8 wherein said cuts and tabs are substantially D-shaped, wherein all of said tabs are bent toward the same side of said web portion, and wherein all of said ribs are depressed from said same side of said web portion.

References Cited in the file of this patent
UNITED STATES PATENTS

| | | |
|---|---|---|
| 1,902,111 | Vaughn | Mar. 21, 1933 |
| 2,288,308 | Williams | June 30, 1942 |
| 2,457,148 | Hall et al. | Dec. 28, 1948 |
| 2,619,855 | Williams | Dec. 2, 1952 |
| 2,718,289 | Collins | Sept. 20, 1955 |
| 2,865,451 | Ihrig | Dec. 23, 1958 |
| 2,913,076 | Marks | Nov. 17, 1959 |